Oct. 21, 1969  C. E. COLLINS  3,474,411
WARNING DEVICE FOR TOWED VEHICLES
Filed Dec. 30, 1966  2 Sheets-Sheet 1
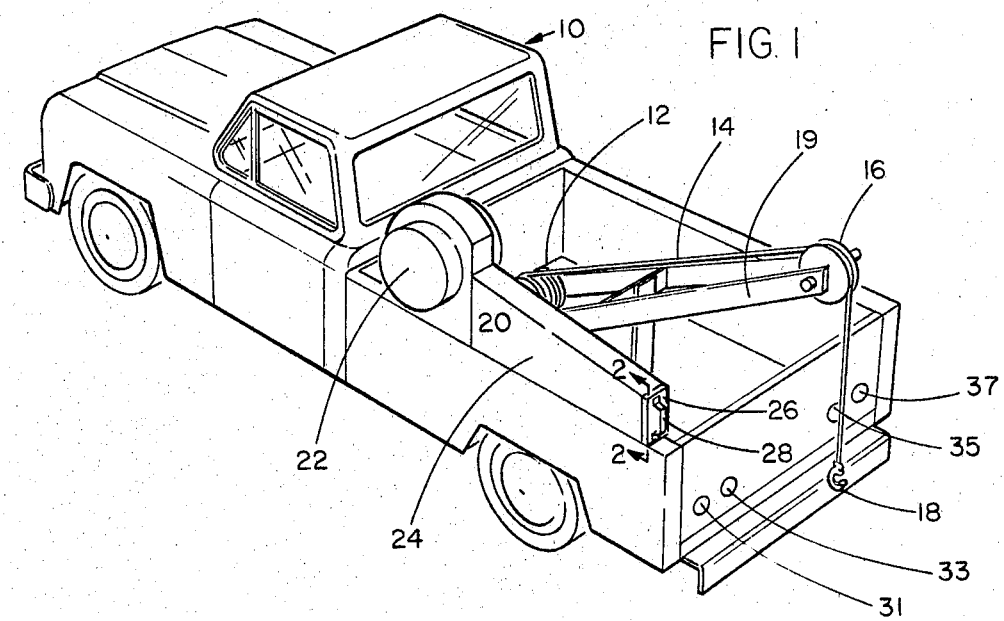
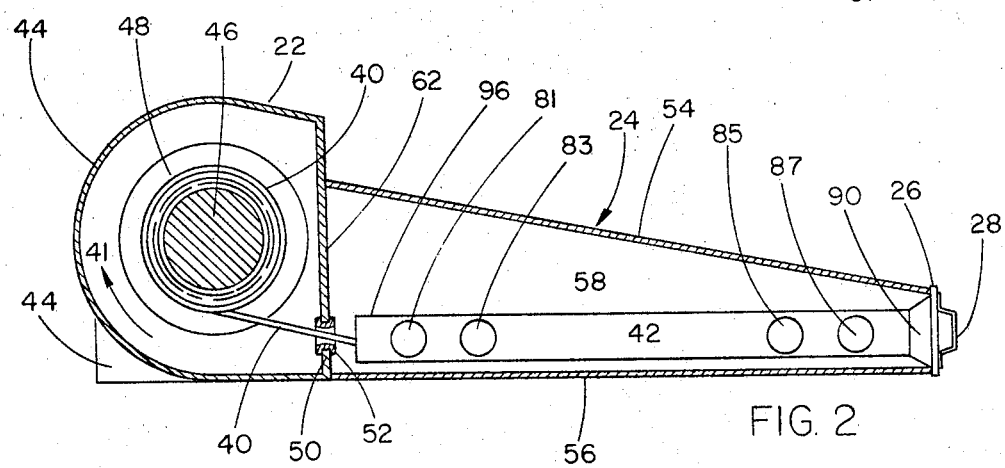
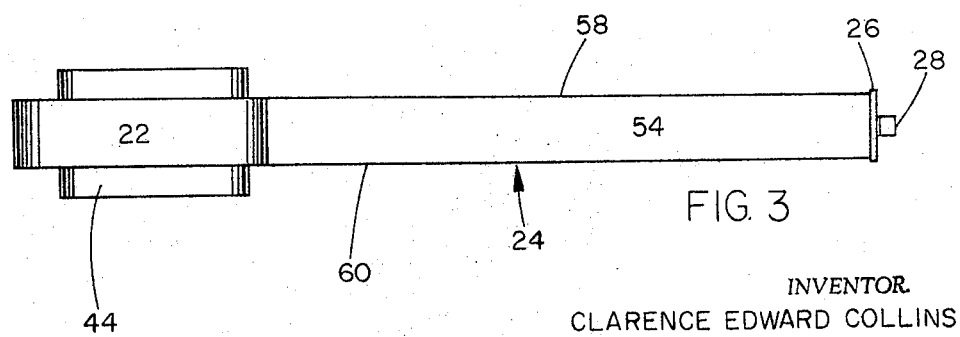
INVENTOR.
CLARENCE EDWARD COLLINS
BY
*Jerome R. Cox*

Oct. 21, 1969   C. E. COLLINS   3,474,411
WARNING DEVICE FOR TOWED VEHICLES
Filed Dec. 30, 1966   2 Sheets-Sheet 2
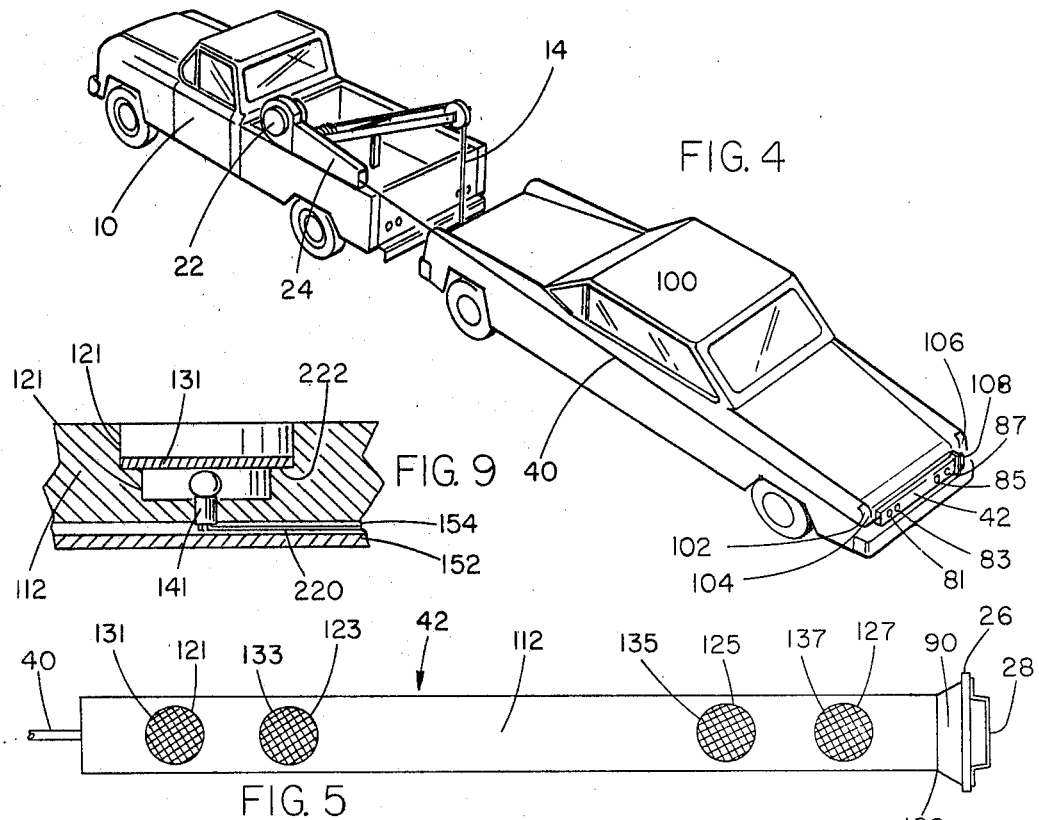
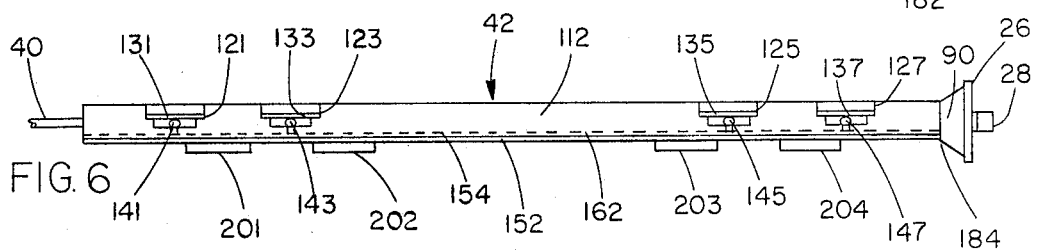
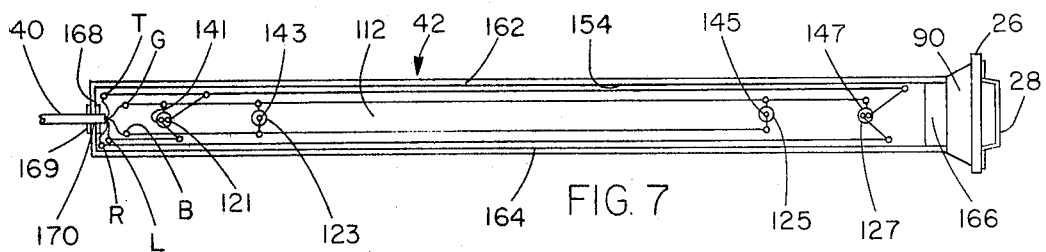
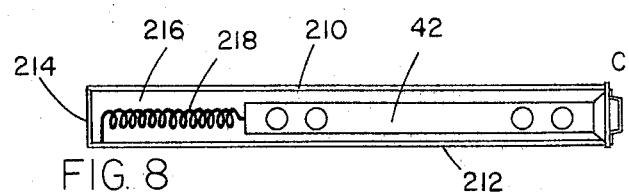
INVENTOR.
CLARENCE EDWARD COLLINS
BY
Jerome R. Cox

# United States Patent Office 3,474,411
Patented Oct. 21, 1969

3,474,411
WARNING DEVICE FOR TOWED VEHICLES
Clarence Edward Collins, 120 Johnson Ave.,
Mount Vernon, Ohio 43050
Filed Dec. 30, 1966, Ser. No. 606,124
Int. Cl. B60q 1/26
U.S. Cl. 340—87　　　　　　　　　　　　　　5 Claims

ABSTRACT OF THE DISCLOSURE

The disclosure in this application relates to a bar having lights mounted thereon which simulate, correspond to, and are activated simultaneously with, the rear lights of a towing vehicle. An extendible power cord, having several conductors, extends from the bar to a cord winding reel mounted on the towing vehicle, the electrical conductors being connected to the system of the towing vehicle. An operator may grasp the bar, which is initially removably mounted on the towing vehicle, pull on it, thus unwinding the cord, and position it on the rear of a towed vehicle. The disclosure includes a preferred embodiment of the invention.

BACKGROUND OF THE INVENTION

Field of the invention

The invention relates to warning devices for use on vehicles and especially highway vehicles.

Description of prior art

The following patents were considered in the preparation of this application:

Stoeck et al. ---------------------------------- 2,424,719
Lethroe ---------------------------------------- 2,667,569
Swayne ---------------------------------------- 2,671,848
Roe -------------------------------------------- 3,059,105
Stofer ----------------------------------------- 2,009,682

These patents were uncovered in a search made in Classes 240 and 340.

Lights on vehicles are commonly used for two purposes. Some lights provide illumination to increase visibility. Other lights provide signals to warn persons about the intention of the vehicle's operator or about some action he has taken. So, for example, automobile head lights illuminate the road ahead, interior lights illuminate objects inside the vehicle, tail lights signal the presence of the vehicle and its approximate width and distance, brake lights signal the application of the vehicle's brakes, and turn signal lights indicate the intention of the operator to turn the vehicle in a particular direction. All of these lights are so valuable as safety equipment that in many States they are required by law on all motor vehicles.

The rear lights of a vehicle, which usually include tail lights, brake lights, and turn signal lights, are important and may on occasion fail or become inadequate. At least one inventor has therefore invented an auxiliary lighting system. This system has two auxiliary tail lights which are electrically connected to the tail lights of a vehicle by means of a network of exterior wires. These auxiliary tail lights may be mounted by brackets to the same vehicle to which they are electrically connected or they may be mounted to a trailer being pulled by that vehicle. These tail lights indicate the presence and the width of the vehicle on which they are properly mounted.

There are at least two difficulties encountered with this device. First, it does not provide any indication of the application of brakes by the operator or of a contemplated turn. Second, it is a time consuming task requiring extensive manipulation to string and support the necessary wires and to mount these lights on any vehicle and especially on a trailer vehicle. However, in applications of this device where the operator is not required to perform this task very often or where time is not an important factor, the device is quite useful.

Often illumination of an area near the vehicle, not illuminated by other lights, is desired. For example, a light may be needed to repair a tire. The vehicle's headlights will not illuminate the area around a wheel. Consequently, several inventors have invented detachably mounted auxiliary illuminating lights. Some are separate from and additional to the usual vehicle lighting system. Others are merely one of the usual lights, such as a taillight, equipped with extra length of electrical conductor and detachably mounted to the vehicle. These devices provide adequate illumination but have no function as auxiliary signals.

When one vehicle tows another vehicle, the towed vehicle often obscures the rear lights of the towing vehicle. Therefore, it becomes desirable and often mandatory that lights be provided on the rear of the towed vehicle.

Generally, the towed vehicle is a vehicle which was manufactured and equipped for use specifically as a towed vehicle. A trailer, for example, is always a towed vehicle. Such a vehicle is usually equipped, when manufactured, with permanent rear lights and a permanently installed wiring system. The wiring system is often provided with an electrical connector near the front of the trailer for connection to the electrical system of the towing vehicle.

Because some trailers are of small height, such as boat trailers, lights mounted on such trailers would be too low for adequate visibility. One inventor has therefore modified the above described trailer lighting system by mounting the trailer lights on a light bar positioned at the trailer's rear. The electrical wiring remains the same as described above and the light bar is a permanent trailer accessory. When a boat is placed on the boat trailer, the light bar is attached to either the boat itself or to the devices provided for securing the boat to the trailer. This, too, adequately serves its purpose but may be used only with towed vehicles equipped with this accessory.

Nothing has heretofore been suggested to provide adequate rear lights for a towed vehicle which was not manufactured and equipped as a towed vehicle.

For example, when an automobile is involved in a collision or for another reason cannot be properly operated, it often must be towed away. If, after a collision, the automobile is preventing the passage of other traffic, it must be removed as rapidly as possible. Often after such collisions, the automobile's electrical system is inoperable. Automobiles are not normally equipped with trailer lights which can be plugged into the electrical system of the towing vehicle. Yet a towed automobile obscures the rear lights of the towing vehicle. Some provision for rear lights on the towed vehicle is necessary.

One example of the importance of such rear lights is an accident of which I have first hand knowledge. It was this accident which caused me to invent my device. A tow truck, towing a large disabled truck, had just rounded a curve in the highway when the towing mechanism became defective. Although this was at night and although there were no rear lights operable on the rear of the towed disabled truck, the tow truck operator was required to stop and repair the towing mechanism. The tow truck itself was completely equipped with lights which were flashing their warning. However, to the operator of a passenger car, which began to round the curve, these lights were obscured by the towed, disabled, truck. The passenger car headlights did not shine around the curve, but rather illuminated the corn field radially outward from the curve. A passenger of the car was killed by the collision. He would not have been, had my invention been properly installed on the towed truck.

If the auxiliary taillights suggested by other inventors were available on towing vehicles, positioning the electrical wires and mounting the lights on the towed vehicle would be too time-consuming. Towing vehicle operators are usually anxious to remove the vehicle from the flow of traffic after a vehicle has become disabled and so do not take the time to mount such lights. However, even if the operator would mount such taillights, they would be unable to signal either turns or the application of brakes.

Furthermore, even if the electrical system of the towed vehicle were operable, it could not be made to signal either the application of the towing vehicle's brakes or the intention of the towing vehicle operator to make a turn.

OBJECTS

It is therefore an object of my invention to provide an improved warning device for towed vehicles.

It is a further object of my invention to provide a device requiring little manipulation for the rapid supply of adequate rear lights on the rear of a towed vehicle.

A still further object of my invention is to provide taillights, brake lights, and turn-signal lights on the rear of a towed vehicle which duplicate and operate simultaneously with the rear lights of the towing vehicle.

Further objects and features of my invention will be apparent from this specification and the claims when considered in connection with the accompanying drawings, illustrating several embodiments of my invention.

I have found that these objects may be accomplished by a warning device for use on a towed vehicle which is connected to a towing vehicle, the device comprising a light structure which comprises a housing and a plurality of electrically energized illumination means secured to said housing and an extendible cord means, which comprise a plurality of electrical conductors connecting said illumination means to the electrical circuit of said towing vehicle for selectively causing the illumination of said illumination means.

More particularly, I have found that these objects may be accomplished by a warning device provided for use on a towed vehicle, said towed vehicle being connected to a towing vehicle and the device comprising (1) a bar having four voids for mounting lights, having a longitudinal channel for containing electrical conductors, and having a removable rear panel portion enclosing said channel; (2) light sources mounted to said flexible bar and facing outwardly from one side of said bar, which sources comprise a plurality of pairs of light bulbs including a pair of dual filament light bulbs symmetrically mounted near opposite ends of said bar, and a pair of single filament bulbs symmetrically mounted near opposite ends of said bar and spaced from said dual filament light bulbs; (3) permanent magnets attached to said bar; (4) a cord containing a portion of five conductors entering said bar at one end, a first of said conductors providing an electrical connection between the ground contact of each of said light bulbs and the electrical ground of said towing vehicle, a second of said conductors providing an electrical connection between the taillights of said towing vehicle and a first pair of oppositely, symmetrically spaced filaments of said bulbs, a third of said conductors providing an electrical connection between the brake lights of said towing vehicle and a second pair of oppositely symmetrically spaced filaments of said bulbs, a fourth of said conductors providing an electrical connection between the left turn signal light of said first vehicle and one of a third pair of oppositely, symmetrically spaced filaments of said bulbs, and a fifth of said conductors providing an electrical connection between the right turn signal light of said towing vehicle and the other of said third pair of oppositely, symmetrically spaced filaments of said bulbs; (5) a cord winding reel mounted to said towing vehicle, having said cord attached thereto and provided with spring means urging the rewind of said cord; (6) a storage compartment mounted on said towing vehicle adjacent to said cord winding reel and having said cord passing therein, and comprising an elongated box having two sides, a top, and a bottom defined by four sheets of material (which should be of a non-magnetic material such as, for example, plastic or preferably aluminum, etc.), having a first end defined by a portion of the housing of said reel, and having a second end unenclosed; and (7) a plate, mounted at the end of said bar opposite to the end entered by said cord, normal to the longitudinal axis of said bar, of length and width slightly larger than the height and width of the second end of said storage compartment and having a handle thereon; whereby said bar is normally contained in said compartment when said spring means is in its most relaxed position whereby said bar may be withdrawn from said storage compartment and the reel unwound, and whereby the bar may be detachably mounted on a second vehicle.

SUMMARY OF THE INVENTION

This invention relates to a complete light signal device which a towing vehicle operator may, with extraordinarily little manipulation, temporarily mount near the rear of a towed vehicle. Broadly, the warning device which is my invention is a combination of; first, a light structure having a plurality of illumination means; and second, extendible cord means for selectively energizing said plurality of illumination means. The preferred embodiment of my warning device invention as illustrated and described is a combination of: first, a light bar on which are mounted lights, corresponding to the lights on the rear of a towing vehicle; second, a long cord through which the lights may be powered and controlled at the towing vehicle; and third, means for resiliently urging the cord and light bar into a position of removable storage on a towing vehicle. For example, such resiliently urging means might be a cord winding reel.

BRIEF DESCRIPTION OF THE DRAWINGS

FIG. 1 is a view in perspective of a tow truck in or on which my warning device is mounted.

FIG. 2 is a sectional view taken substantially on the line 2—2 of FIG. 1 showing my warning device in the position it occupies when not in use.

FIG. 3 is a plan view of my warning device in the position shown in FIG. 2.

FIG. 4 is a view in perspective of a tow truck on which a portion of my warning device is shown mounted and a towed automobile on which the light bar of my warning device is shown mounted.

FIG. 5 is a front elevation of the light bar of my warning device. The side on which the lights are visible is termed the front. The front of the light bar faces rearward when the light bar is mounted on a towed vehicle.

FIG. 6 is a top view of the light bar of my warning device.

FIG. 7 is a rear elevation of the light bar of my warning device with the rear panel portion removed to expose the wiring of the light bar.

FIG. 8 is a sectional view of a portion of a device constituting another embodiment of my invention.

FIG. 9 is a view in section of a segment of a light bar constituting an embodiment of my invention showing the detail of the attachment of one of the rear lights to the bar.

In describing the preferred embodiment of the invention illustrated in the drawings, specific terminology will be resorted to for the sake of clarity. However, it is not intended to limit the patent to the specific terms so selected, and it is to be understood that each specific term includes all technical equivalents which operate in a similar manner to accomplish a similiar purpose.

DESCRIPTION OF PREFERRED EMBODIMENTS

In FIG. 1, I have shown a pickup truck 10 equipped with a winch 12, a cable 14, a pulley 16, a hook 18 and a support structure 19. This truck is also equipped with the preferred embodiment of my invention indicated generally by 20. The truck is also shown with four rear lights 31, 33, 35, and 37.

The preferred embodiment generally comprises a cord winding reel 22, a storage compartment 24, an electrical cord not shown in FIG. 1, and a light bar of which only the plate 26 and the handle 28 (which are attached to the end of the bar) are shown in FIG. 1.

Although I have shown my warning device mounted on a motor vehicle which is a pickup truck, it may also be mounted on other trucks, other motor vehicles such as farm tractors, for example, or on water vehicles.

FIG. 2 and FIG. 3 show in detail the storage compartment 24, the cord winding reel 22, and the storage positions of the light bar 42 and the cord 40.

The cord winding reel 22 has a housing 44 in which a rotatable cylinder 46 having circular end flanges 48 (one shown) is mounted to function as a spool. The cylinder is shown as having wound thereon a major portion of the electrical cord 40.

The rotatable cylinder 46 is urged by conventional spring means (not shown) in the direction 41 (clockwise on drawing) so as to tend to wind the cord 40 around the cylinder 46.

The reel housing has a hole 50 therethrough around which is a grommet 52. The grommet 52 provides a passage which is free of sharp cutting or scraping edges to allow the free non-abrasive passage of the cord 40.

The storage compartment 24 is defined by a rectangular top panel 54, a rectangular bottom panel 56, a trapezoidal side panel 58, and trapesoidal side panel 60 (not shown in FIG. 2 but indicated in FIG. 3). I prefer that each panel be constructed of a non-magnetic material such as aluminum so that there will be no magnetic attraction between the storage compartment and the magnets positioned on the rear of the light bar as described below. The end of the storage compartment 24 into which the cord 40 enters is enclosed by a portion 62 of the cord winding reel housing 22.

The light bar 42 is positioned longitudinally within the storage compartment 24. Generally, the light bar has mounted thereon four lights 81, 83, 85, and 87. A rectangular bevelled guide 90 is fixed to the end of the light par transversely to the longitudinal axis of the light bar. A rectangular plate 26 is fixed onto the guide 90, extends beyond the edges of the guide 90, and has larger dimensions than the open end of the storage compartment 24. This plate seats against but is not attached to the edges of the walls forming the storage compartment. A handle 28 is attached to the plate 26.

The force exerted by the spring, which urges the winding of the cord 40 around the cylinder 46, is applied at the end 96 of the light bar 42 by means of the cord 40. The light bar 42 is thus urged into the storage compartment toward the grommet 52. However, the plate 26 at the opposite end of the light bar 42 prevents the entrance of the light bar 42 into the storage compartment 24 any further than is shown in FIG. 2.

The tension applied to the light bar 42 by the cord 40 and the counterbalancing force exerted on the end plate 26 serve to removably hold the light bar 42 in the position shown. In this position, the light bar is protected and safely stored away, yet it is easily available for quick use.

In FIG. 4, I have shown the preferred embodiment of my invention in its operative condition. The tow truck 10 has mounted thereon the cord winding reel 22 and the storage compartment 24 of my invention. The tow truck 10 has the automobile 100 in tow by means of a cable 14. The light bar 42 is shown detachably fixed to the rear of the automobile 100. The electrical cord 40 extends from the reel 22 through the grommet 52 (shown in FIG. 2 only), through the storage compartment 24, to the rear of the towed vehicle, and into the end of the light bar 42.

The lights 81, 83, 85, and 87 which are mounted to the light bar, are clearly visible to anyone viewing the rear of the automobile 100. The automobile's permanent rear lights 102, 104, 106, and 108 are also shown in FIG. 4.

The essential details of the light bar 42 are shown in FIGURES 5, 6, 7, and 9.

The mounting to which the lights and wires are mounted is not necessarily of any particular configuration. The desirable features of the mounting are that it has at least one dimension long enough to permit adequate spacing of the rear lights and that it be formed to permit the mounting of the lights and wires. Spacing would be deemed adequate if, from a car approaching the towed vehicle from the rear, a driver is able to distinguish a left and right side of the mounting.

The mounting configuration I prefer is an elongated, rectangular block 112 having voids formed therein to provide for the mounting of the lights and wires. I prefer a flexible rubber or plastic bar; however, other flexible and non-flexible materials could be used.

In the preferred bar 42 are shown voids 121, 123, 125, and 127 into which the light lenses 131, 133, 135, and 137, and the light bulbs and sockets 141, 143, 145 and 147 are fixedly mounted.

The rear portion (i.e., the portion hidden from view by an observer at the rear of the towed vehicle) of the bar 112 is a removable panel 152. In my preferred embodiment, the panel 152 is a rectangular sheet of flexible rubber. It is removably attached to the rear of the remainder of the bar 112 by conventional means such as screws (not shown).

In FIG. 7, the light bar 42 is shown with the removable rear panel 152 removed to expose the terminal portions of the light bulbs and sockets 141, 143, 145, and 147 and the electrical wiring within the light bar.

Another void, channel 154, is formed in the bar 112. It is a thin rectangular channel having a length and width slightly less than the length and width of the bar. Four shoulders 162, 164, 166, and 168 define the walls of the channel 154, and the removable rear panel 152 is seated against such shoulders 162, 164, 166 and 168 when the panel is attached.

The cord 40 enters the channel 154 through a grommet 169 and a groove 170 in the shoulder 168.

I have shown two outer symmetrically spaced bulbs 141 and 147 as dual filament bulbs each having two ungrounded contacts. The inner two symmetrically spaced bulbs and sockets 143 and 145 are shown as single filament bulbs each having a single ungrounded contact. Obviously, these positions could be reversed, three single filament bulbs could be used, one triple filament bulb could be used, or the total number of filaments could be increased or decreased with a corresponding increase or decrease in signal capability, visibility, and safety. One possibly preferred arrangement of lights would be to have four dual filament bulbs. One filament of each bulb would be connected to the taillights of the truck. The remaining filaments in two of the bulbs would be connected to the truck brake lights. The remaining filaments in the two other two lights would be connected to the truck turn signals.

One conductor of the cord (FIG. 7) is electrically connected to terminal G and to the grounded base terminal of each bulb socket. The other end of this conductor is electrically connected to the electrical ground of the tow truck or other towing vehicle.

A second conductor is electrically connected to terminal T and to each of two symmetrically spaced bulb filaments. In the preferred embodiment I use one of the dual filaments in the outer bulbs 141 and 147. The other end of this conductor is electrically connected to the ungrounded terminal of the towing vehicle's taillights.

A third conductor is electrically connected to terminal B and to another pair of symmetrically spaced filaments. I use the single filaments contained in the inner bulbs 143 and 145. The other end of this conductor is electrically connected to the ungrounded terminal of the towing vehicle's brake lights.

A fourth conductor is electrically connected to the terminal L and to one of the two remaining symmetrically spaced bulb filaments. I used the other filament in the left outer bulb 141. The other end of this fourth conductor is electrically connected to the ungrounded terminal of the towing vehicle's left turn signal light.

A fifth conductor is electrically connected to the terminal R and to the other of the said remaining symmetrically spaced filaments. I use the other filament in the right outer bulb 147. The other end of this fifth conductor is electrically connected to ungrounded terminal of the towing vehicle's right turn signal light.

Many trucks are equipped with a flasher system. With such a flasher system, the operator throws a switch which causes all lights on the vehicle to flash alternately on and off. The above described connections allow the lights of my light bar to likewise flash when the other truck lights do so.

The conventional means by which said "other ends" of the conductors are connected to the electrical system of the towing vehicle is by both a brush system normally provided in a standard cord winding reel and other wiring installed in the towing vehicle.

Although unnecessary in my invention, my preferred embodiment has a square guide 90 (FIGS. 5, 6, and 7) with bevelled edges. The pitch of the bevel is such that each bevelled edge terminates adjacent to outer surfaces of the bar 112 as shown at 182 and 184. The maximum length and width of the guide is equal to or slightly smaller than the length and width of the end opening of the storage compartment 24 (shown in FIGS. 1 and 2).

A square flat plate 26 is positioned on the guide 90 as previously described. A handle 28 is attached to the plate 26.

Although a great number of means could be used to detachably mount my light bar on a towed vehicle, I prefer the use of permanent magnets 201, 202, 203, and 204. These are shown attached by conventional means (not shown), such as screws or glue for example, to the removable rear panel portion 152 of the bar 112.

In FIGURE 8, I have shown an alternate embodiment of my invention. The storage housing for this embodiment is an elongated box, made of non-magnetic metallic sheets and having an open end. It may be mounted near the rear of a towing vehicle with the open end rearward. The storage housing comprises five rectangular metal sheets joined to form the top 210, the bottom 212, the closed end 214, the first side 216, and the second side (not shown because removed from the housing in the showing in FIG. 8).

The light bar 42 is the same as the bar shown in FIGS. 2, 3, 5, 6 and 7 and is positioned in a storage position similar to that of the preferred embodiment. However, the cord 218 is formed into a flexible helix. The elastic force of the cord serves to resiliently urge both the cord 218 and the light bar 42 into the storage housing. The electrical connections and the operation of the warning device are otherwise similar to those shown in connection with the preferred embodiment of my invention as described above.

In FIGURE 9, I have shown the detail of one of the rear lights mounted to the bar. Since all lights are mounted substantially the same, I have shown only one.

FIG. 9 shows a cross sectional view of a segment of the flexible bar 112, which includes the removable rear panel 152. The channel 154 is shown with an electrical conductor 220 therein attached to the light bulb and socket 141. A void 121 is formed in the bar 112 in which the recessed lens 131 and the light bulb and socket 141 are mounted. The void 121 comprises three coaxial cylindrical voids, arranged end to end. The recessed lens 131 may thus seat against the shoulder 222 formed where two of the coaxial cylindrical voids meet. The light bulb and socket 141 may be pressure fit into the third cylindrical void. The glass envelope portion of the light bulb and socket 141 is positioned within the central cylindrical void.

The lenses are recessed to protect them. However, it is obvious that there are many various alternative means which could be used to mount the lights of my invention.

OPERATION

The advanatge available from an embodiment of my invention is that my invention provides a unique combination of two important features.

The first feature is the safety feature. My invention provides complete rear warning signals which incldue taillights, turn signal lights, and brake lights. The driver of the towing vehicle and the other drivers in the nearby traffic no longer need rely solely on one light or a pair of lights which do not signal stops or turns.

The second feature is the "use" feature. No matter how much safety might be improved by use of my device, if the towing vehicle operator would fail to use it, there could be no safety improvement. The towing vehicle operator will not use a device which takes any substantial time to install. Such an operator is expected by police to rapidly remove an inoperable vehicle so that normal traffic might resume. He is anxious to complete each particular towing assignment so that he may proceed to the next one. Often the destination to which the towed vehicle is to be towed is not far from the place where the towed vehicle became inoperable. The driver may feel that the substantial time used to attach lights is not justified by a short trip. Faced with a desire to move rapidly, the towing vehicle operator will not install a complex lighting system wherever it will consume any substantial time.

Referring now to FIGURES 1, 2, and 4, the manipulation by the towing vehicle operator in installing my light bar is seen to be simple. The operator, in the usual situation, backs the towing vehicle into a position directly in front of or directly behind the vehicle to be towed. The operator then walks to the rear of the truck 10 and grasps the handle 28 which is initially positioned near the open (rearmost) end of the storage compartment 24. He then pulls the handle in a rearward direction parallel to the longitudinal axis of the storage compartment 24. He thereby begins to unwind the cord 40 from the reel and withdraws the light bar 42 from the storage compartment 24. Continuing to pull, the operator walks to the rear of the towed vehicle 100 and thereby withdraws more of the cord 40 from the reel. He then places the magnets (201, 202, 203, and 204 in FIG. 6) attached to the rear (blind side) of the light bar against a rear portion of the towed vehicle 100. Because the preferred light bar 42 is flexible, it will conform to the curvature in the body of the towed vehicle 100.

That is all the operator is required to do. There are no wires to string because the single cord of my invention is held taut by the spring or other resilient means in the reel. Obviously, there are no clamps to position or tighten. No tools are required. The operator is now free to hook up and tow away the towed vehicle 100.

On the rear of the towed vehicle for which my invention is used, there is displayed a set for rear signal lights which correspond to and are activated simultaneously with the signal lights on the rear of the towing vehicle. Drivers approaching from the rear are fully warned.

After arriving at his destination, the towing vehicle operator need only again grasp the handle 28 and pull the light bar away from the towed vehicle's body to reduce the magnetic attraction. He then walks towards the storage compartment 24, holding the handle 28, and allows the reel 22 to rewind the cord 40.

With only a minimal guidance from the operator, the force exterted by the cord 40 on the light bar 42 will guide the end of the light bar into the open (rearward) end of the storage compartment 24.

The light bar 42 continues to be withdrawn into the storage compartment 24 by the spring actuated cylinder 46. Eventually, one or two edges of the bevelled guide 90 will contact one or two edges of the storage compartment walls. The beveled edges will guide the plate 26 to its position seating against the edges of the four walls of the storage compartment so that the plate covers the open end of the storage compartment.

By this action, the operator has safely stored and protected the light bar in a position where it may again be withdrawn and the above procedure repeated.

If the embodiment shown in FIG. 8 is used, the operation is similar. The only difference being that the coils in the resilient cord 218 urge the light bar into the storage compartment.

Other features could be used with my invention.

For example, a switch (not shown) might be positioned inside the storage compartment 24 or elsewhere. The switch may be mechanically positioned so that it would be tripped at the time of the entrance of the light bar into the storage compartment. It would be electrically connected so that the tripping of this switch would stop the supply of power to all lights on the light bar when the light bar is in a stored position. This would reduce battery drain and extend the lift of the light bulbs in the light bar.

The reel could be provided with a releasable stop mechanism similar to that used in an ordinary window shade. Such a mechanism would freely permit the electrical cord to be unwound. It would prevent the rewinding of the cord except that the stop could be released to allow the cord to be rewound by a small unwinding movement of the electrical cord.

I claim:

1. A warning device for use on a towed vehicle which is connected to a towing vehicle comprising:
   (a) a light mounting bar;
   (b) a pair of light sources mounted near opposite ends of the bar and electrically connected to be activated simultaneously with tail lights of the towing vehicle;
   (c) a pair of light sources mounted near opposite ends of the bar and electrically connected to be actuated simultaneously with brake lights of the towing vehicle;
   (d) a light source mounted near one end of the bar and electrically connected to be activated simultaneously with a left turn signal of the towing vehicle;
   (e) a light source mounted near the other end of the bar and electrically connected to be activated simultaneously with a right turn signal of the towing vehicle; and
   (f) extendible cord means comprising a plurality of electrical conductors connecting said lights to the electrical circuit of the towing vehicle for selectively illuminating said lights, the cord means being sufficiently extendible to permit attachment of the light mounting bar on the towed vehicle.

2. The warning device of claim 1 wherein said bar is provided with means for detachably mounting the bar to a towed vehicle.

3. The warning device of claim 2 wherein said means for detachably mounting said bar to a towed vehicle comprises means for magnetic attraction.

4. The warning device of claim 1 wherein said bar is flexible.

5. A warning device provided for use on a towed vehicle, said towed vehicle being connected to a towing vehicle and the device comprising
   (1) a bar having four voids for mounting lights, and having a channel for containing electrical conductors;
   (2) light sources mounted to said bar at said voids and facing outwardly from one side of said bar, which sources comprise a plurality of pairs of light bulbs including a pair of dual filament light bulbs symmetrically mounted near opposite ends of said bar, a pair of single filament bulbs symmetrically mounted near opposite ends of said bar and spaced from said dual filament light bulbs;
   (3) permanent magnets attached to said bar;
   (4) a cord containing a portion of a plurality of conductors entering said bar at one end, a first of said conductors providing an electrical connection between the ground contact of each of said light bulbs and the electrical ground of said towing vehicle, a second of said conducters providing an electrical connection between the taillights of said towing vehicle and a first pair of oppositely, symmetrically spaced filaments of said bulbs, a third of said conductors providing an electrical connection between the brake lights of said towing vehicle and a second pair of oppositely, symmetrically spaced filaments of said bulbs, a fourth of said conductors providing an electrical connection between the left turn signal light of said towing vehicle and one of a third pair of oppositely, symmetrically spaced filaments of said bulbs, a fifth of said conductors providing an electrical connection between the right turn signal light of said towing vehicle and the other of said third pair of oppositely, symmetrically spaced filaments of said bulbs;
   (5) a cord winding reel mounted to said towing vehicle, having said cord attached thereto and provided with spring means urging the rewind of said cord;
   (6) a storage compartment, mounted on said towing vehicle, adjacent to said cord winding reel, having said cord passing therein;
   whereby said bar is normally contained in said compartment when said spring means is in its most relaxed position and whereby said bar may be withdrawn from said storage compartment and the reel unwound, and whereby the bar may be detachably mounted to a towed vehicle.

References Cited

UNITED STATES PATENTS

| Re. 15,437 | 8/1922 | Anderson | 240—8.18 |
| 2,103,336 | 12/1937 | Novoveszky | 240—52.15 |
| 2,738,492 | 3/1956 | Arneson et al. | 340—87 |
| 2,940,064 | 6/1960 | Wilfert | 340—87 |
| 3,345,506 | 10/1967 | Hautzenroeder | 240—8.18 |

JOHN W. CALDWELL, Primary Examiner

M. SLOBASKY, Assistant Examiner

U.S. Cl. X.R.

240—8.3, 8.18, 52.15; 340—90